Figure 1A:
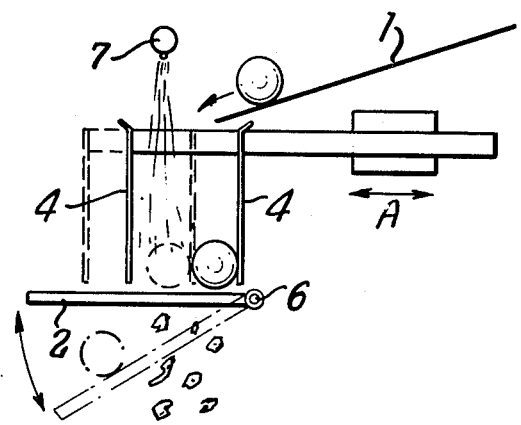

United States Patent [19]

Cope

[11] 4,191,102

[45] Mar. 4, 1980

[54] EGG-DESHELLING APPARATUS

[75] Inventor: Cecil J. Cope, Berkshire, England

[73] Assignee: Cope Whelon and Company, Limited, Reading, England

[21] Appl. No.: 897,455

[22] Filed: Apr. 18, 1978

Related U.S. Application Data

[62] Division of Ser. No. 725,768, Sep. 23, 1976, abandoned.

[51] Int. Cl.² .................. A23N 5/00; A47J 43/14
[52] U.S. Cl. ............................ 99/580; 99/568; 209/675
[58] Field of Search .................. 99/568–571, 99/579–583; 209/675, 698

[56] References Cited

U.S. PATENT DOCUMENTS

| | | | |
|---|---|---|---|
| 2,535,980 | 12/1950 | Yeamans | 99/568 |
| 2,734,540 | 2/1956 | Geisler | 99/571 |
| 2,898,961 | 8/1959 | Kauffman et al. | 99/568 |
| 3,059,678 | 10/1962 | Staples | 99/571 |
| 3,859,907 | 1/1975 | Hatcher | 99/571 |
| 4,082,856 | 4/1978 | Zweip et al. | 99/571 |

FOREIGN PATENT DOCUMENTS 562527 of 1957 Belgium .................. 209/675

*Primary Examiner*—Philip R. Coe
*Assistant Examiner*—Timothy F. Simone
*Attorney, Agent, or Firm*—Pollock, VandeSande and Priddy

[57] ABSTRACT

Apparatus for de-shelling hard-boiled eggs which comprises a feeding arrangement for feeding hard-boiled eggs to a position between two walls. The walls are reciprocated to bat the eggs to-and-fro between the walls to shatter the egg shells. The fragments of shell are washed away by a water spray, the de-shelled egg then being discharged. The walls may be parallel walls between which the eggs are passed on a conveyor or may be part of a continuous wall forming an oval container in which the eggs are de-shelled individually. In this case a plurality of said oval containers may be provided.

3 Claims, 4 Drawing Figures

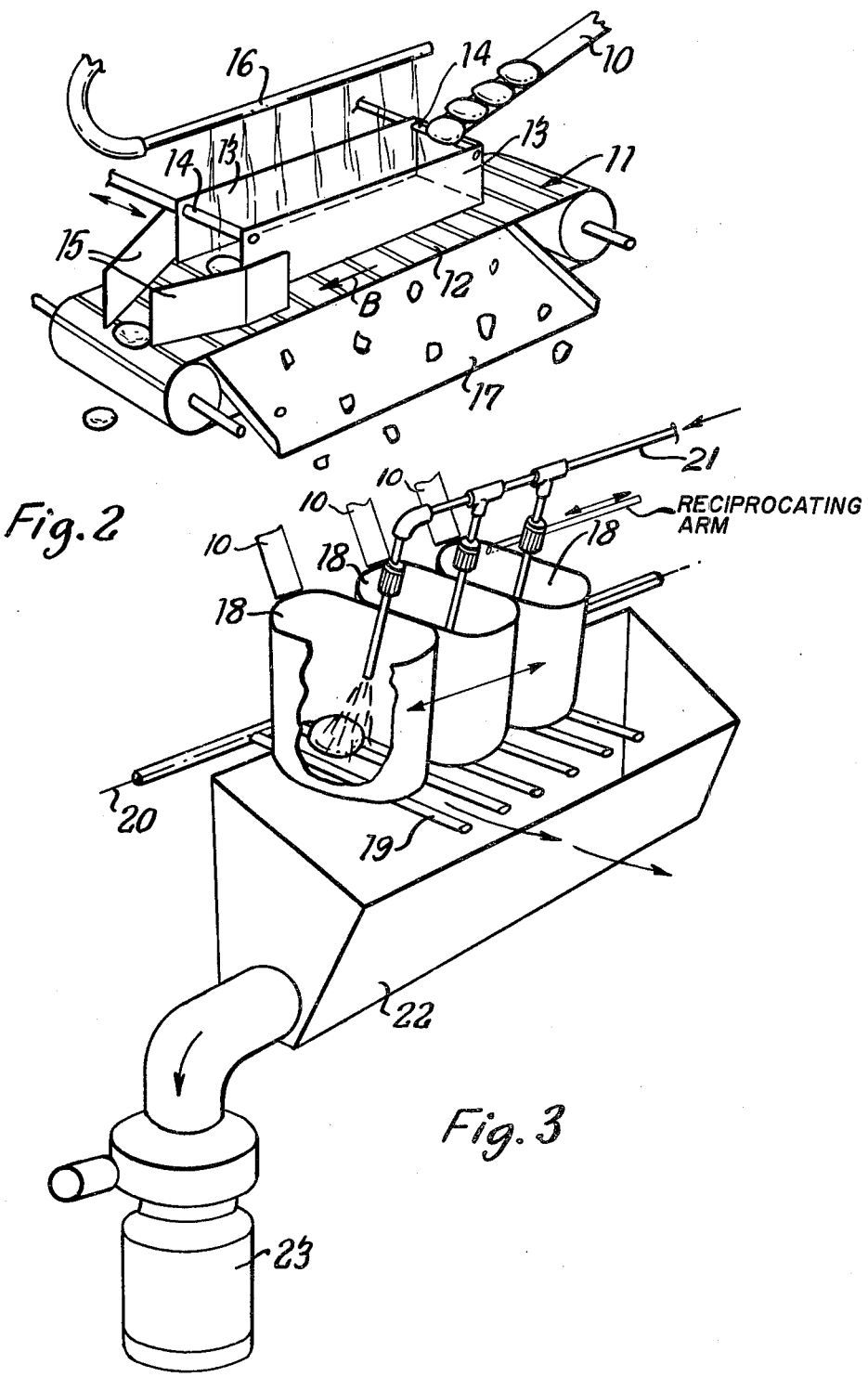

EGG-DESHELLING APPARATUS

This is a division, of application Ser. No. 725,768, filed Sept. 23, 1976, abandoned. This invention relates to egg de-shelling apparatus and particularly, but not exclusively, to apparatus intended to de-shell hard boiled eggs prior to having a coating put on the egg to form scotch eggs.

According to the present invention there is provided egg de-shelling apparatus for de-shelling hard boiled eggs, including means for feeding an egg to a de-shelling station, reciprocatable means for applying a plurality of blows to the egg in the de-shelling station to shatter the shell thereof, washing means to wash the broken shell away and discharge means for discharging the de-shelled egg from the de-shelling station to a discharge station.

The reciprocatable means for applying a plurality of blows to the egg may comprise opposed vertical surfaces connected together for reciprocal movement so that an egg positioned between said surfaces is batted to and fro between said surfaces thereby to break the shell of the egg.

In one embodiment, said opposed surfaces are formed on two spaced parallel planar batting walls connected together for reciprocal movement in a direction transverse to the planes of the walls. In another embodiment, the de-shelling station includes a closed continuous wall and said surfaces are formed on opposed faces of the closed wall. In this way each egg is kept separate while its shell is being removed. To de-shell a plurality of eggs simultaneously a plurality of said closed walls may be provided, all operatively connected together for reciprocal movement.

When spaced parallel walls are provided, the means for supporting the eggs may comprise a conveyor movable in a direction parallel to said parallel batting walls. Preferably, the conveyor includes means to locate the eggs to prevent movement of the egg relative to the conveyor in the direction of movement of the conveyor so as to control the length of time eggs on the conveyor are between the batting walls. In one form the conveyor is formed of a plurality of spaced parallel bars extending transversely to the direction of movement of the conveyor.

Figure 1B:
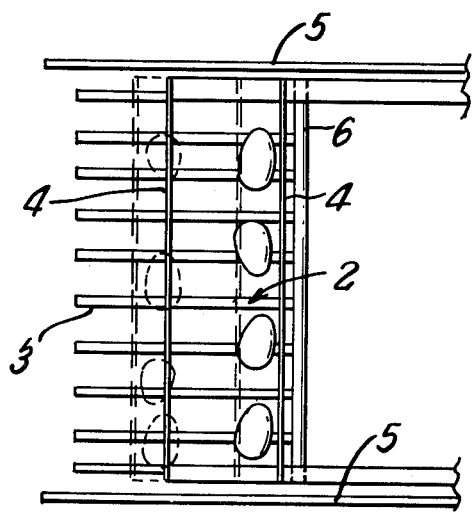

Preferred embodiments of the invention will now be described by way of example with reference to the accompanying drawings in which:

FIGS. 1a and 1b show an arrangement suitable for intermittent production, FIG. 1b being a plan view of FIG. 1a, FIG. 2 shows an arrangement suitable for continuous production and, FIG. 3 shows an arrangement in which eggs in the denesting station are separated into individual compartments.

Referring now to FIGS. 1a and 1b there is shown egg deshelling apparatus for de-shelling hard boiled eggs which includes a feeding chute 1 which feeds hard-boiled eggs from a cooking unit (not shown) into a de-shelling station. The de-shelling enclosure includes a grid 2 formed of spaced parallel stainless steel bars or rods 3 for supporting the eggs, a pair of spaced parallel vertically disposed side walls 4 which are connected together for reciprocal movement in the direction shown by the arrow A transverse to the plane of the walls 4 and a pair of opposed fixed end walls 5 which serve to prevent eggs from escaping laterally from between the walls 4. The end walls 5 extend outwardly past the walls 4 so that the ends of the walls 4 are closed irrespective of their position relative to the end walls 5 due to the reciprocal movement.

The egg support grid 2 is pivotally mounted so as to be pivotable about one edge 6 to a downward position (shown in dotted lines) to enable the de-shelled eggs to fall or roll to a discharge station. A water spray 7 extends over the grid 2 to provide a cold water spray to wash the broken egg shell away.

In operation, hard boiled eggs are fed onto the grid 2 and the walls 4 are reciprocated to bat the eggs to-and-fro between the walls. The blows applied to the eggs are sufficient to shatter and fragment the shell which is washed out through the grid 2 by the water spray 7. When the eggs are de-shelled the grid 2 is pivoted downwardly to discharge the eggs to a discharge station or to a conveyor (not shown).

For de-shelling eggs weighing approximately 45–50 grams and having a diameter of approximately 1½ inches it has been found that a suitable spacing between the walls 4 is approximately 3½ inches with a stroke of approximately 1½ inches for the reciprocal movement. A speed of reciprocation of 620 cycles per minute, one cycle being a forward and reverse movement, de-shelled the eggs in approximately 2½ seconds.

It will be appreciated that the spacing between the batting walls and the speed and strokes of reciprocation of the walls may be adjustable or be varied to suit the particular eggs being de-shelled.

In the second embodiment, illustrated in FIG. 2, the eggs to be de-shelled are fed from a chute 10 onto an endless conveyor 11 formed of spaced parallel bars or rods 12 extending transversely of the direction of movement of the conveyor shown by the arrow B. The eggs are fed by the conveyor 11 between two opposed spaced parallel walls 13 which lie parallel to the direction of movement of the supporting surface of the conveyor 11. The batting walls 13 are connected at their ends by arms 14 and are reciprocated to-and-fro transversely across the conveyor. The spacing of the rods 12 is such that an egg can rest on and between the two adjacent rods so as to be located thereby in the longitudinal direction of movement of the conveyor.

At the discharge end of the conveyor 11 a pair of guide walls 15 are positioned to guide the de-shelled eggs to a discharge station, the guide walls overlapping the walls 13 to ensure that eggs are guided to the discharge station. The broken and fragmented shells are washed by a water spray 16 through the conveyor 11 onto a waste chute 17.

In operation, the hard boiled eggs to be de-shelled are fed onto the conveyor 11 where they are located in a longitudial direction with respective to the direction of movement of the conveyor by the rods 12. The eggs are however capable of transverse movement relative to the direction of movement of the conveyor so that when the batting walls 13 are reciprocated the eggs are batted to and fro between the walls to break and fragment the shell, the fragments being washed away by the water spray 16.

Since the eggs are constrained against longitudinal movement relative to the conveyor, the time that the eggs are between the batting walls 13 can be controlled. With batting walls 6 inches long batches of three de-shelled eggs have been produced in 2½ seconds which gives a rate of production of approximately 4000 de-shelled eggs per hour.

It will be appreciated that the length of the batting walls 13, the spacing between and the stroke of the walls and the speed of the conveyor may be adjustable or may be varied to suit the particular eggs being de-shelled. It will also be understood that many variations may be made in the apparatus, for example, the egg support grid and the conveyor may be formed of a mesh.

FIG. 3 illustrates a third embodiment in which the eggs are located in individual compartments in the de-shelling station.

Each compartment 18 comprises a continuous closed wall enclosing a substantially oval area. The lower end of each compartment 18 is closed by a grid 19, similar to the grid illustrated in FIGS. 1a and 1b, consisting of spaced parallel stainless steel rods. The grid 19 is pivot-able about an axis 20 between a raised position in which it supports eggs in the compartments 18 and a lowered position in which de-shelled eggs can fall or roll to a discharge station or to a further conveyor.

As in the other embodiments a water spray 21 is provided to wash the shattered shells from the eggs, the shells falling into a trough 22 from where they pass to a waste disposal unit 23 for disposal.

In this embodiment the feeding means includes a chute 10 for each of the compartments 18 so that the eggs are guided into the compartment 18. As shown in FIG. 3, each egg is supported in its associated oval compartment 18 in an orientation wherein the longitudi-nal axis of the egg is substantially parallel to the longitu-dinal axis of said oval compartment so that, when the interconnected compartments 18 are reciprocated in a direction transverse to said longitudinal axes, the oppos-ing interior curved surfaces of each compartment strike the sides of the egg supported therein to assist the egg in adopting this orientation and to shatter the shell of said egg.

Although not shown, the feeding means of each em-bodiment includes a gate arranged so that eggs are fed to the de-shelling station at a predetermined rate.

What is claimed is:

1. Egg-deshelling apparatus for deshelling hard boiled eggs, comprising a plurality of open-top and open-bottom compartments each of which is adapted to receive an individual egg to be deshelled, each of said compartments comprising a continuous closed wall having curved surfaces which enclose a substantially oval area, said plurality of closed walls being intercon-nected to one another with the longitudinal axes of said oval areas being disposed substantially parallel to one another, means for feeding a plurality of hard boiled eggs to the open tops of said plurality of compartments respectively to deposit one of said eggs in each com-partment, means located below the open bottoms of said compartments for supporting said eggs in their respec-tive compartments, the longitudinal axis of each egg being oriented substantially along the longitudinal axis of the oval compartment area in which said egg is sup-ported, means for reciprocating said interconnected compartments in a direction transverse to the longitudi-nal axes of said oval areas to cause the opposing interior curved surfaces of said continuous closed walls to apply a plurality of blows to the sides of the hard boiled eggs in said compartments, thereby to shatter the shells of said eggs, means for washing the broken shells out of said compartments, and release means for moving said supporting means away from the open bottoms of said compartments to discharge the deshelled eggs from said compartments.

2. The apparatus of claim 1 wherein said supporting means comprises a grid having a plurality of spaced parallel rods extending in directions substantially paral-lel to the longitudinal axes of said oval areas.

3. The apparatus of claim 2 wherein said grid is mounted for pivotal movement about a pivot axis which extends transverse to the directions of elongation of said rods, said release means being operative to pivot said grid about said pivot axis to discharge said deshelled eggs from said compartments.

* * * * *